July 3, 1928.
H. O. HEM
WEIGHING SCALE
Filed Oct. 18, 1926
1,675,976
2 Sheets-Sheet 1
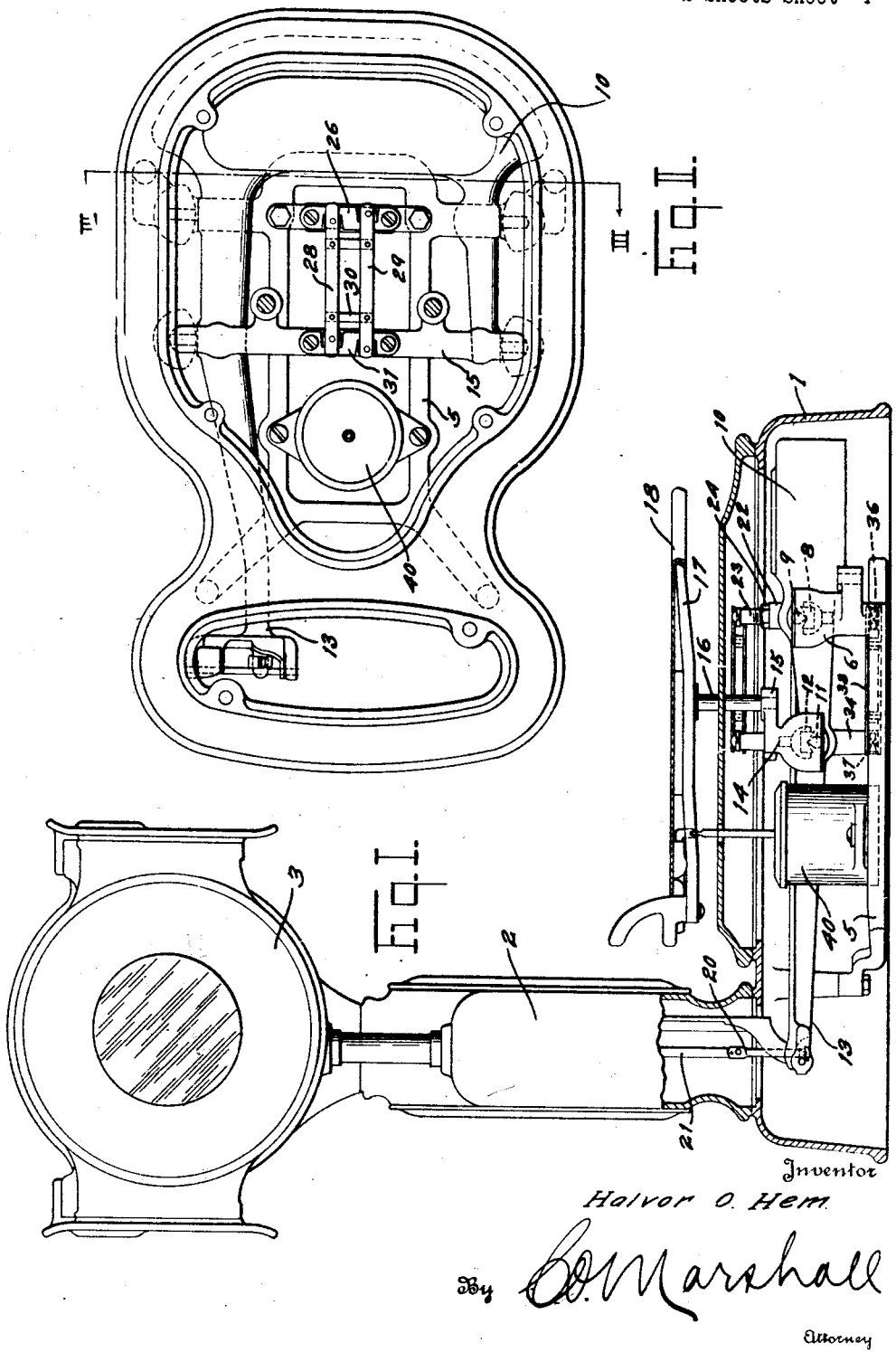
Inventor
Halvor O. Hem
By Ed. Marshall
Attorney July 3, 1928.
H. O. HEM
WEIGHING SCALE
Filed Oct. 18, 1926
1,675,976
2 Sheets-Sheet 2
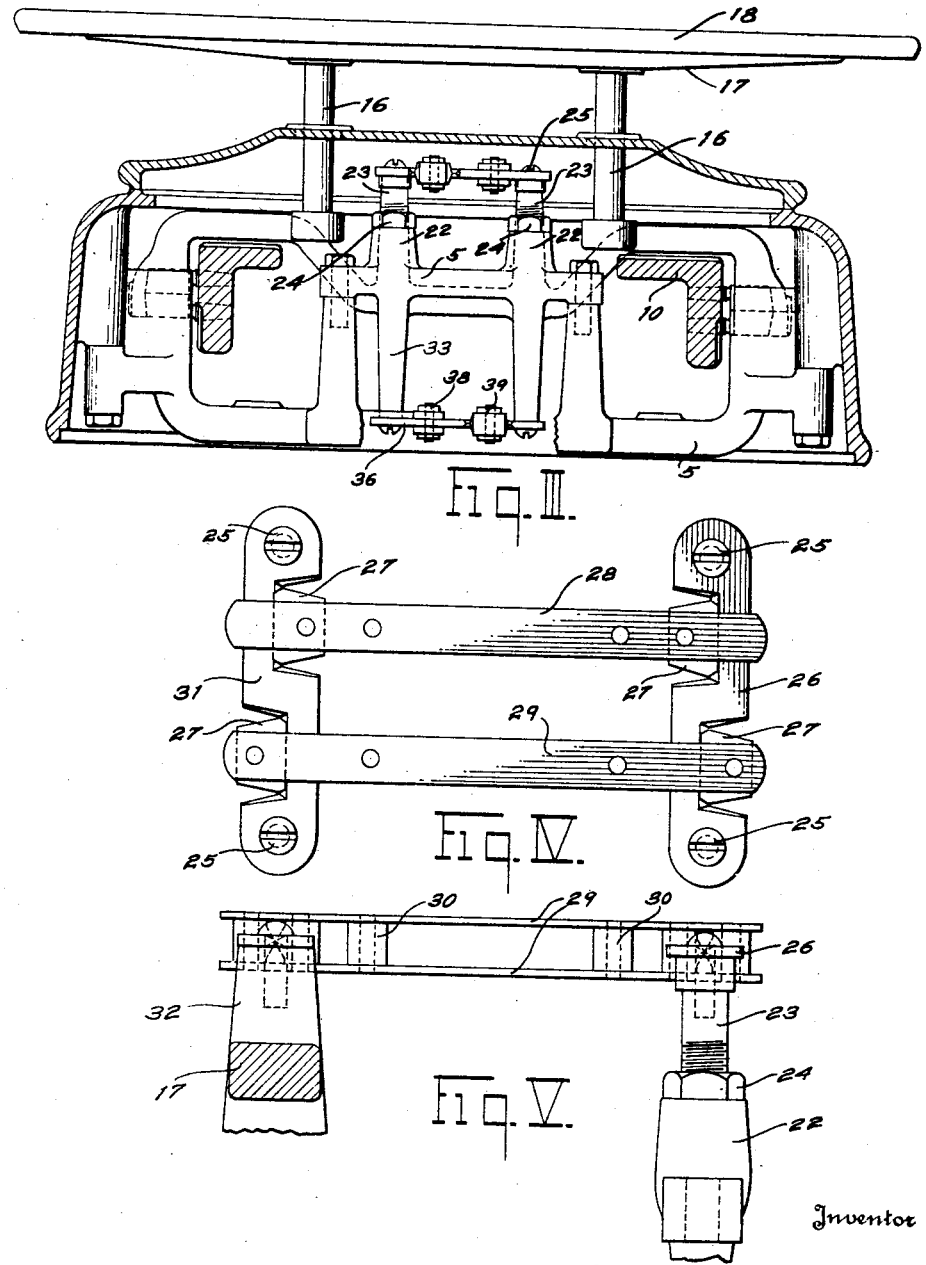
Inventor
Halvor O. Hem.
By D. Marshall
Attorney Patented July 3, 1928.

1,675,976

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed October 18, 1926. Serial No. 142,218.

This invention relates to weighing scales, and more particularly to scales of the type in which the platform or commodity-receiver is supported upon the main lever at two points.

One of the principal objects of this invention is to improve the means employed for preventing the commodity-receiver from tipping when a load is placed adjacent one of its edges.

Another object of my invention is to provide a simple and efficient stabilizing means for scale platforms which is adaptable for use in scales having enclosed lever mechanism, particularly those of the type employing only one platform supporting lever.

Still another object is the provision of a stabilizing means for a weighing scale platform in which the pressure on the pivots and the consequent friction are reduced.

And still another object is the provision of simple check link mechanism in the operation of which there is set up no tendency of the load bearings to slide over their pivots.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view of a weighing scale embodying my invention, parts being broken away to show the mechanism and parts being shown in section;

Figure II is a top plan of the base of the scale, parts being removed for purposes of illustration;

Figure III is an enlarged sectional elevation on the line III—III of Figure II;

Figure IV is a plan view on a further enlarged scale showing a pair of my check links and their pivots; and Figure V is a side elevational view of the parts shown in Figure IV and their supports.

Referring to the drawings in detail, the scale of my invention comprises a base 1 upon one end of which is erected an upright housing 2, and superimposed upon the latter is a substantially cylindrical casing 3 adapted to support and house a weight indicating chart (not shown). Fixed to downwardly projecting bosses forming integral parts of the base 1 is a skeleton frame 5 provided with a pair of vertical projections 6 in the upper ends of which are mounted bearings 8 adapted to support the fulcrum pivots 9 of the main lever 10. The lever 10 is also provided with a pair of pivots 11 engaging the bearings 12 carried by the platform supporting structure or bracket 14. A pair of bosses 15 forming integral parts of the bracket 14 are bored to receive the studs 16, the latter supporting a grid or spider 17 upon which is mounted the commodity-receiver or platform 18. The nose end 13 of the lever 10 is suitably connected by means of a stirrup 20 and flexible ribbon 21 to some form of load-counterbalancing means, as, for example, a pendulum or springs (not shown) to offset a load placed upon the platform 18. The load-counterbalancing and indicating mechanism per se forms no part of the present invention and is not, therefore, shown or described.

As is most clearly shown in Figure III, the skeleton frame 5 is provided with a pair of upwardly extending bosses 22, threaded into which is a pair of studs 23, the studs being adapted to be locked in adjusted position by lock nuts 24. Secured by means of screws 25 to the upper ends of the studs 23 is a plate 26 having oppositely extending knife edges formed upon it. The oppositely extending knife edges of the plate 26 are engaged by the bearing blocks 27 which are pivoted between upper and lower members 28 of a push link and upper and lower members 29 of a pull link. The link members are spaced apart and the push and pull links connected by spacing bars 30 pivoted to the link members. The other ends of the links are also equipped with bearing blocks 27 which engage oppositely formed knife edges on another plate 31 which is secured by means of additional screws 25 upon the upper ends of bosses 32 formed upon the spider 17.

Elongated bosses 33 project downwardly from the skeleton frame 5 below the upwardly projecting bosses 22, and elongated bosses 34 project downwardly from the spider 17 below the upwardly projecting bosses 32, and knife edge plates 36 and 37 are secured on the lower ends of the bosses 33 and 34 and connected by push and pull links 38 and 39 similar in construction to those connecting the plates 26 and 31.

The vibration of the mechanism is damped by the dash pot 40.

When a load is placed upon the platform directly above the load pivots 11 there is no pressure on the knife edges of the plates 26, 31, 36 and 37. When a load is placed adjacent the rear of the platform the link members 29 are put under tension and the link members 38 under compression. When a load is placed adjacent the front of the platform the link members 28 are put under compression and the link members 39 under tension. Since the pressure on the knife edges of the plates 26, 31, 36 and 37 caused by a load near the front or rear of the platform is divided between the upper and lower plates it is possible to place these plates much closer to the fulcrum and load pivots of the lever than would be the case if the pressure were not so divided. It is possible to place these plates at a distance from the fulcrum and load pivots equal to only half the length of the usual spider stem. The platform 18 may, therefore, be placed comparatively close to the surface upon which the scale rests and the platform lever and check link mechanism may be enclosed in the relatively shallow housing.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a frame, a lever fulcrumed thereon, said lever having a load pivot, a platform support carried thereby, and check links connecting said platform support and said frame above and below said load pivot.

2. In a device of the class described, in combination, a frame, a lever fulcrumed thereon, said lever having a load pivot, a platform spider carried by said load pivot, said platform spider having portions projecting upwardly and downwardly with respect to the load pivot and said frame having portions projecting upwardly and downwardly with respect to the fulcrum pivot of said lever, links connecting the upwardly projecting portions of said spider and frame, and links connecting the downwardly projecting portions of said spider and frame.

3. In a device of the class described, in combination, a frame, a lever having a fulcrum pivot supported by said frame, said lever having a load pivot, a platform support carried by said load pivot, push and pull links pivoted to said frame and said platform support above said fulcrum and load pivots, and push and pull links pivoted to said frame and said platform support below said fulcrum and load pivots.

4. In a device of the class described, in combination, a frame, a lever having a fulcrum pivot supported on said frame, said lever having a load pivot, a platform spider carried by said load pivot, upwardly and downwardly projecting members on said frame and said platform spider, knife edge plates secured to said upwardly and downwardly projecting members, and push and pull links extending between the knife edge plates secured to the upwardly and downwardly extending frame members and the knife edge plates secured to the upwardly and downwardly extending members of said spider.

5. In a device of the class described, in combination, a frame, a lever having a fulcrum pivot supported by said frame, said lever having a load pivot, a platform spider carried by said load pivot, said frame and platform spider having members extending upwardly and downwardly with respect to said fulcrum and load pivots, links pivotally connecting the upwardly extending members of said frame and spider, links pivotally connecting the downwardly extending members of said frame and spider, and a housing enclosing said lever and spider.

6. In a device of the class described, in combination, a frame, a lever having a fulcrum pivot supported by said frame, said lever having a load pivot, a platform spider carried by said load pivot, said frame and platform spider having members extending upwardly and downwardly with respect to said fulcrum and load pivots, links pivotally connecting the upwardly extending members of said frame and spider, links pivotally connecting the downwardly extending members of said frame and spider, a housing enclosing said lever and spider, and means carried by said spider and projecting upwardly through said housing for supporting a platform.

7. In a device of the class described, in combination, a base housing, a frame secured therein, a lever having a fulcrum pivot supported on said frame, said lever having a load pivot, a platform spider carried by said load pivot, members on said frame and spider projecting upwardly and downwardly with respect to said fulcrum and load pivots, links pivotally connecting the upwardly projecting members on said frame and spider, links pivotally connecting the downwardly projecting members on said frame and spider, a cover plate for said base housing, and means on said spider extending upwardly through said housing for supporting a platform

HALVOR O. HEM.